United States Patent
Torii (10) Patent No.: US 8,876,303 B2
(45) Date of Patent: Nov. 4, 2014

(54) LENS BARRIER DEVICE

(75) Inventor: Shinnosuke Torii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 262 days.

(21) Appl. No.: 12/966,523

(22) Filed: Dec. 13, 2010

(65) Prior Publication Data

US 2011/0157699 A1    Jun. 30, 2011

(30) Foreign Application Priority Data

Dec. 25, 2009  (JP) .................................. 2009-295439

(51) Int. Cl.
  *G02B 23/16*  (2006.01)
  *G03B 9/14*  (2006.01)
  *G03B 17/00*  (2006.01)

(52) U.S. Cl.
  CPC . *G03B 9/14* (2013.01); *G03B 17/00* (2013.01)
  USPC ........................ 359/511; 359/230; 396/448

(58) Field of Classification Search
  USPC .............. 359/511, 230, 234, 236, 507–508; 396/448
  See application file for complete search history.

(56) References Cited

U.S. PATENT DOCUMENTS 5,739,962 A * 4/1998 Asakura et al. ............... 359/700
2010/0296803 A1 * 11/2010 Nagaoka et al. ................ 396/79

FOREIGN PATENT DOCUMENTS

JP    2010-156732 A    7/2010

* cited by examiner

*Primary Examiner* — James Phan
(74) *Attorney, Agent, or Firm* — Carter, DeLuca, Farrell & Schmidt, LLP (57) ABSTRACT

In a lens barrier device, one barrier blade is arranged at a different height in the optical axis direction from another barrier blade, and a barrier base is provided with a regulating portion which is at the outer peripheral portion of an optical axis forward end side barrier blade and which regulates the position in the optical direction of the optical axis forward end side barrier blade, thus forming the lens barrier device as a unit. If rotation shafts for the barrier blades are formed on an external cover, deformation or the like would be generated when the external cover is assembled to the apparatus, resulting in an increase in the requisite drive force for the opening/closing operation. Hence, it is possible to prevent a suitable opening/closing operation from being hindered by such an increase in the requisite drive force.

9 Claims, 13 Drawing Sheets

LENS BARRIER DEVICE

BACKGROUND OF THE INVENTION

1. Field of the Invention

The present invention relates to a lens barrier device of an imaging apparatus such as a video camera or a digital camera.

2. Description of the Related Art

A conventional lens barrier device has the following construction (See, for example, Japanese Patent Application Laid-Open No. 2010-156732). In the following, the construction will be described with reference to FIG. 12. In this conventional example, to protect an imaging lens, four barrier blades in total, i.e., outer barrier blades 120a and 120b, and inner barrier blades 130a and 130b, rotate around rotation shafts 112a and 112b parallel to the optical axis of an imaging lens provided in an external cover 110.

Figure 13:
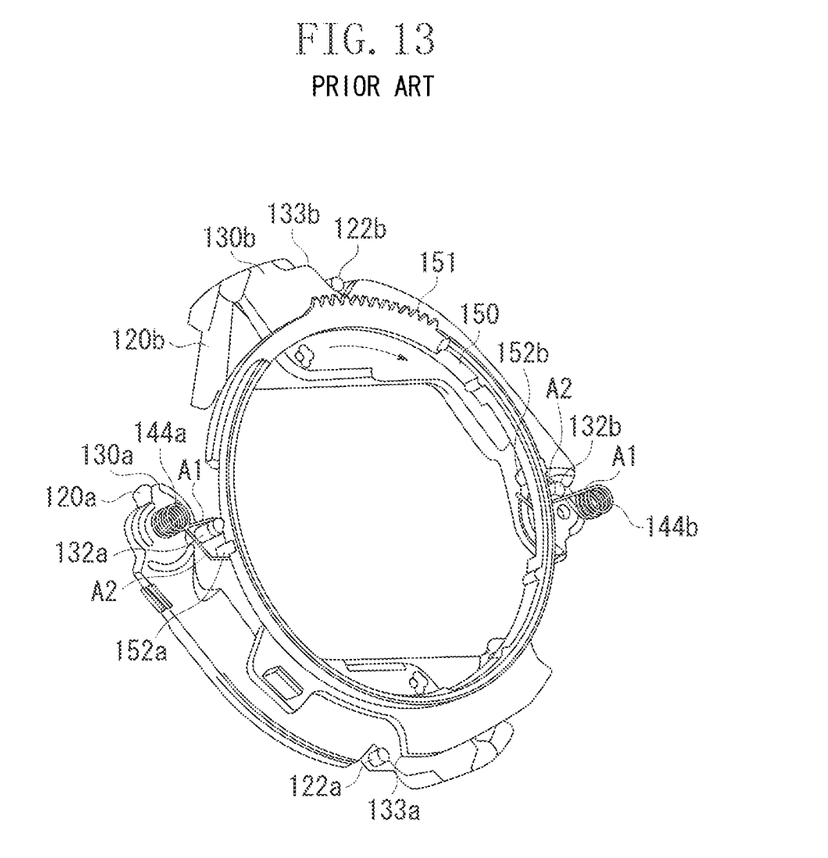
FIG. 13 is a diagram illustrating how conventional barrier blades are assembled.

As illustrated in FIG. 13, when the lens barrier device is in the open state, the outer barrier blade 120a and the inner barrier blade 130a, and the outer barrier blade 120b and the inner barrier blade 130b, are respectively overlapped one upon the other in the optical axis direction. With this construction, the projection area as seen from the optical axis forward end side in the open state is reduced, thereby realizing a reduction in the diameter of the imaging lens of the imaging apparatus.

Figure 12:
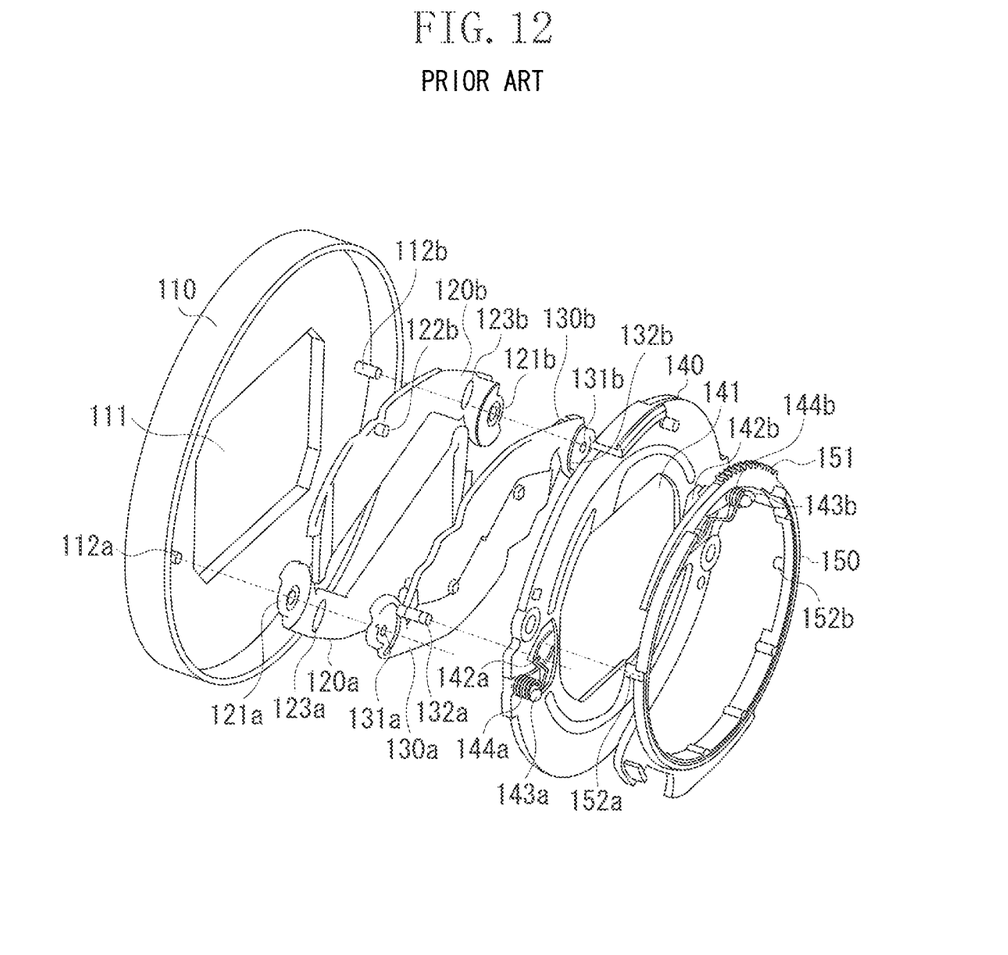
FIG. 12 is an exploded perspective view of a conventional lens barrier device.

However, in the above described conventional technique, the external cover 110 is assembled to the imaging apparatus main body in combination with some other external cover, and the like. Thus, deformation due to the assembling is generated in the external cover 110. As a result, the rotation shafts 112a and 112b undergo deformation, and the requisite driving force for the opening/closing operation increases. As a result, a proper opening/closing operation is hindered.

On the other hand, if an attempt is made to realize in the external cover 110 a configuration preventing deformation due to the assembling to the imaging apparatus main body, there is involved a limitation to the configuration of the external cover arranged in front of the imaging apparatus main body. This is not desirable since it leads to a limitation in terms of salability such as design.

In view of this, there has been formed a lens barrier unit by additionally providing another member having the rotation shafts 112a and 112b between the external cover 110, and the outer barrier blades 120a and 120b. This configuration is generally used for a lens barrier device of a construction with the above-mentioned lens barrier unit fixed to the external cover.

This makes it possible to suppress the deformation due to the assembling of the external cover. However, this involves an increase in the number of components, resulting in an increase in the production cost of the imaging apparatus main body, and an increase in the size in the optical axis direction of the apparatus due to the additional components.

SUMMARY OF THE INVENTION

According to an aspect of the present invention, a lens barrier device includes first and second barrier blades situated on an optical axis forward end side with respect to an imaging lens and configured to rotate so as to allow opening and closing, a barrier base retaining the first and second barrier blades, and a drive unit for opening and closing the first and second barrier blades, wherein the first barrier blade is on the optical axis forward end side with respect to the second barrier blade, and wherein the first and second barrier blades are situated between a guide portion and a regulating portion; the guide portion guides rotation of the second barrier blade provided on the barrier base; and the regulating portion is situated on the optical axis forward end side of the first barrier blade provided on the barrier base and is configured to regulate the position in the optical axis direction of the first barrier blade.

According to the present invention, a lens barrier device can be configured in a unit. As a result, it is possible to provide a lens barrier device in which the influence of the deformation due to the assembling of the external cover is suppressed without involving an increase in the number of components or an increase in the size in the optical axis direction of the apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

[Whole Construction of Lens Barrel]

Figure 1A:
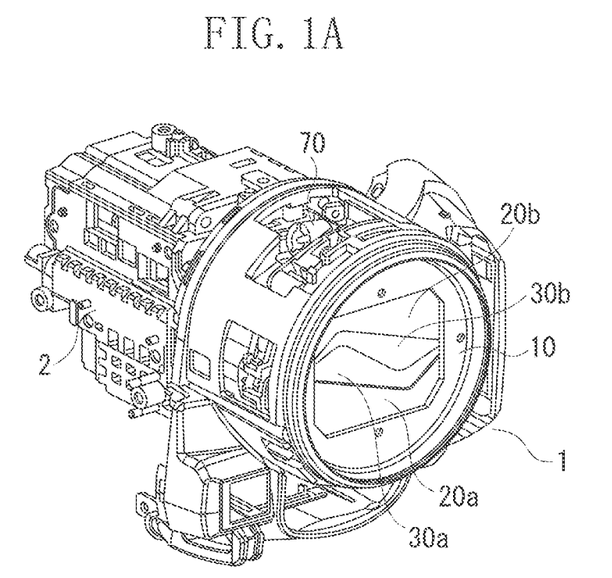
FIGS. 1A and 1B are external perspective views of a lens barrel.
Figure 1B:
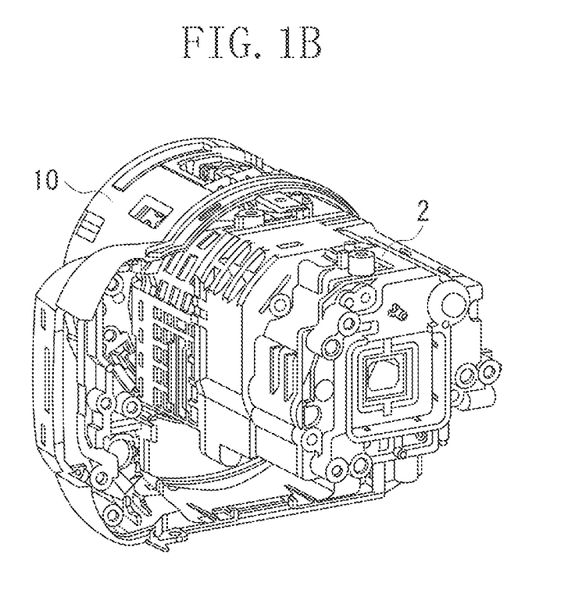

FIGS. 1A and 1B are external perspective views illustrating a lens barrel unit of an imaging apparatus. The lens barrel unit includes a lens barrier device 1, an imaging lens 2, and an external cover 3. As illustrated in FIGS. 1A and 1B, the lens barrier device 1 is arranged on the optical axis forward end side (subject side).

Figure 2:
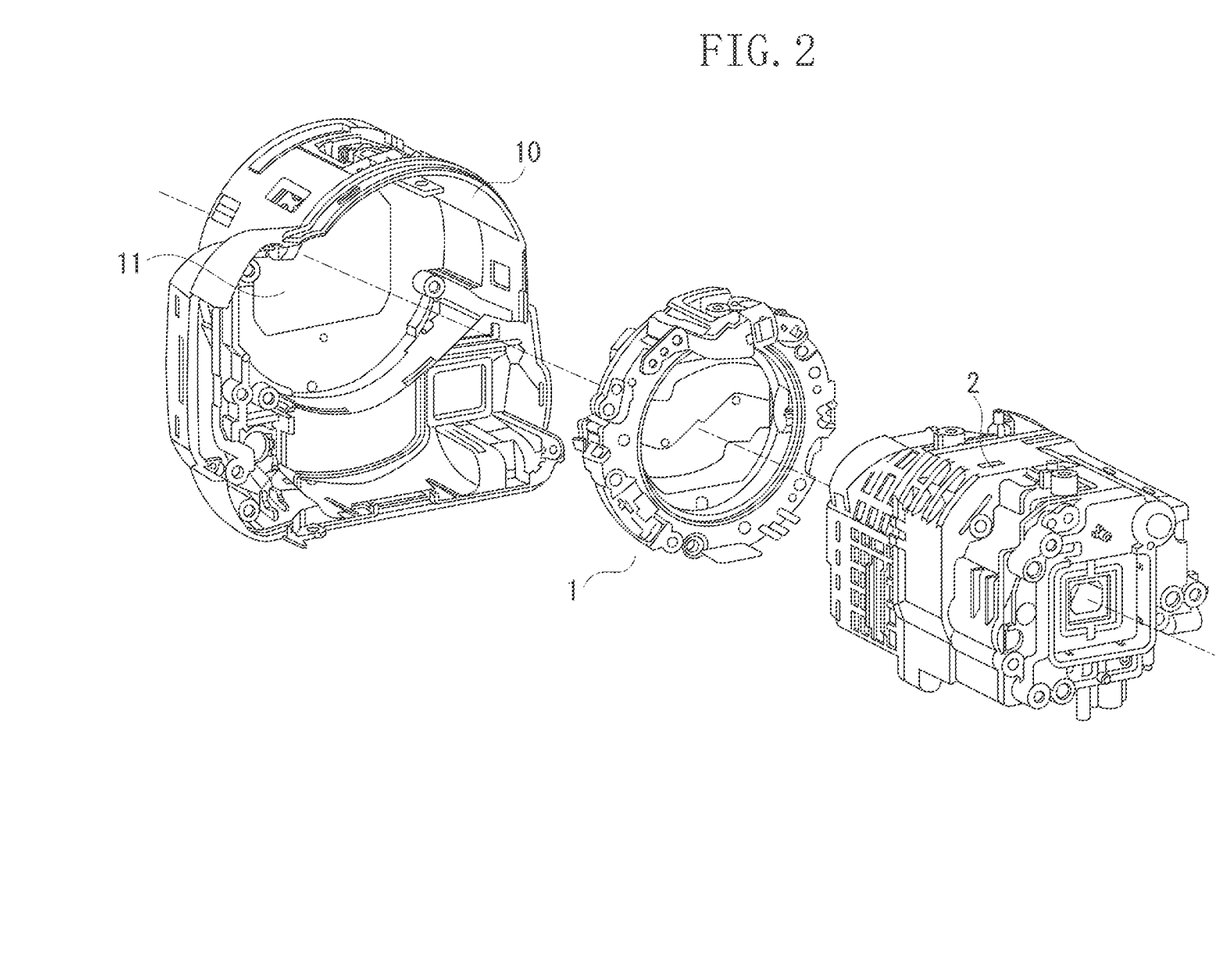
FIG. 2 is a first exploded perspective view of an imaging apparatus illustrated in FIGS. 1A and 1B.
Figure 3:
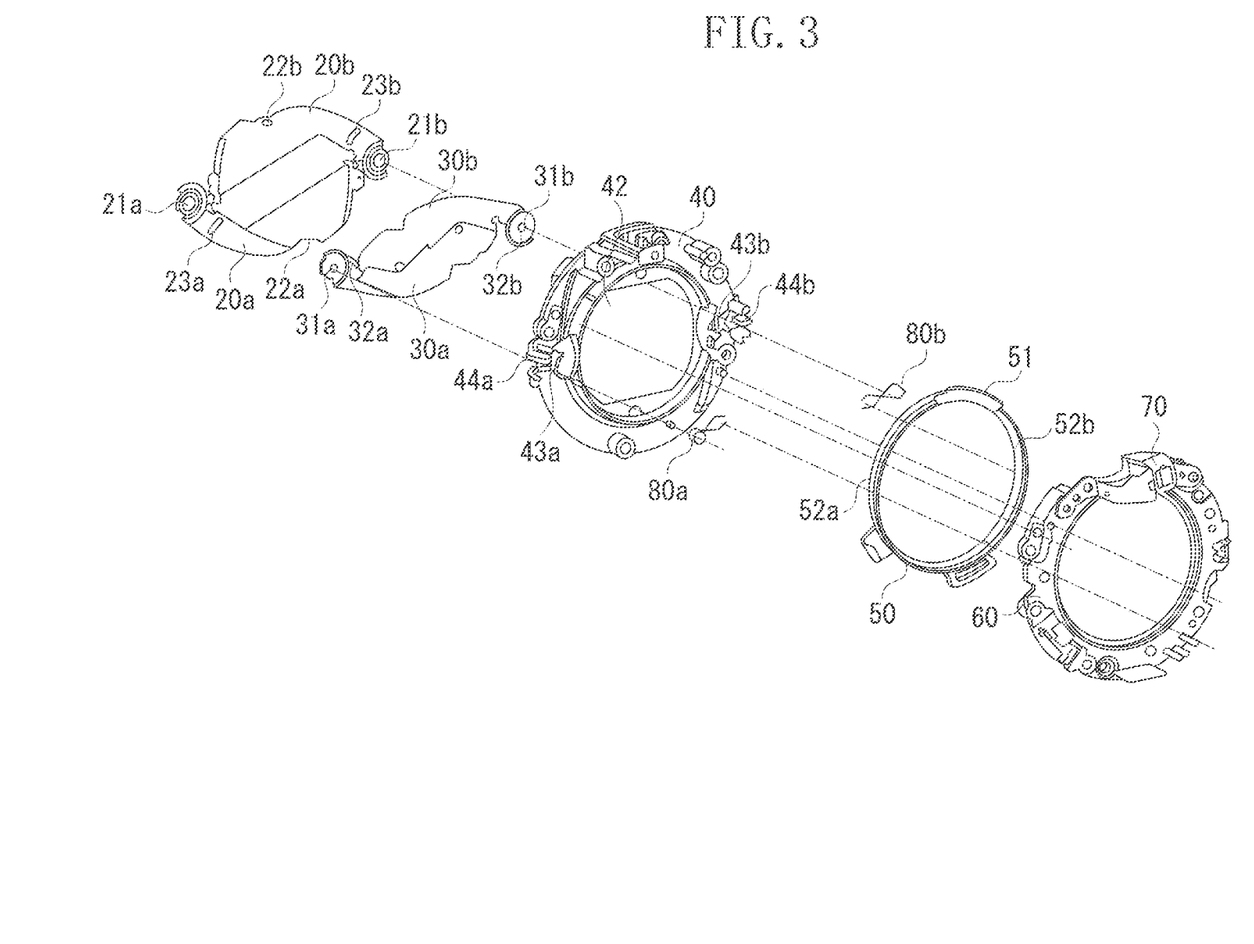
FIG. 3 is a second exploded perspective view of the imaging apparatus illustrated in FIGS. 1A and 1B.
Figure 4:
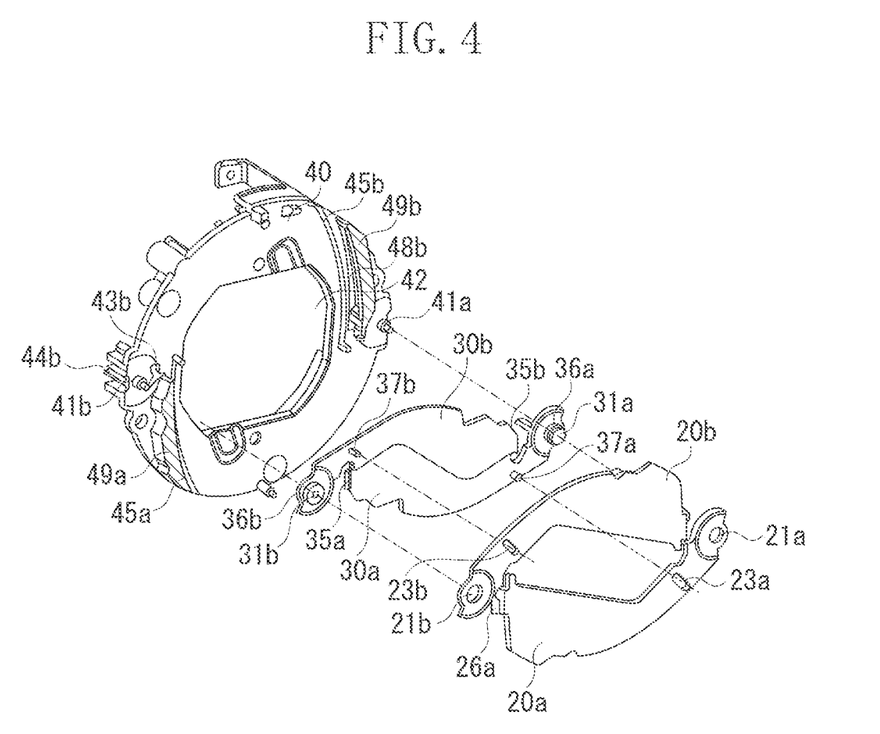
FIG. 4 is a third exploded perspective view of the imaging apparatus illustrated in FIGS. 1A and 1B.
Figure 5A:
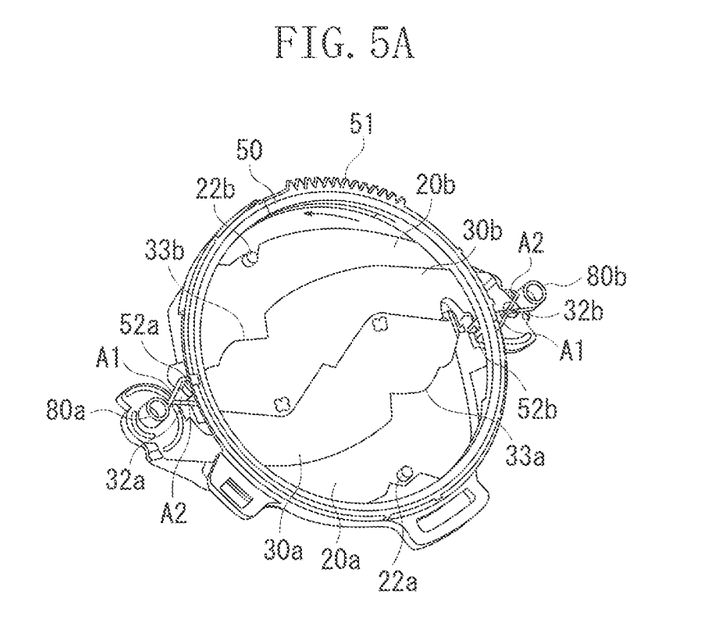
FIGS. 5A and 5B are assembly diagrams of barrier blades.
Figure 5B:
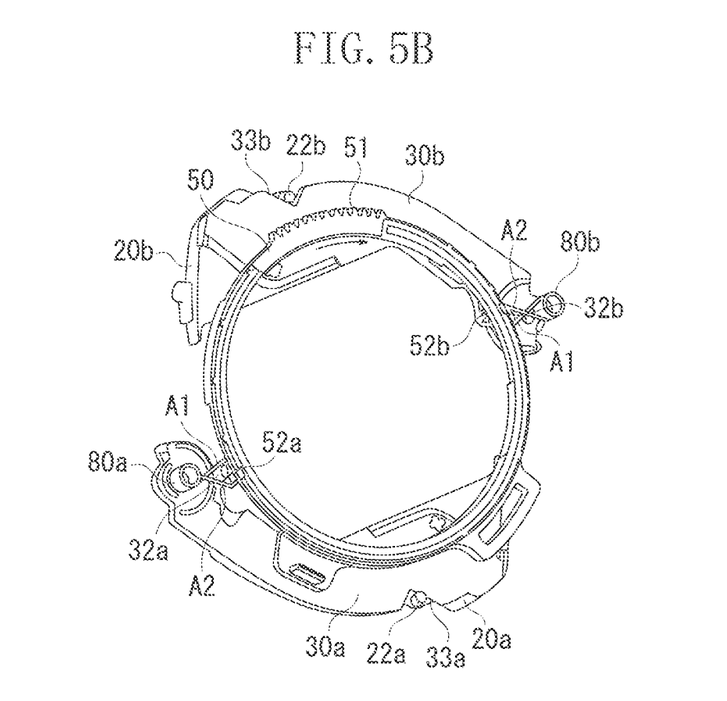

FIG. 2 is an exploded perspective view of the lens barrel illustrated in FIGS. 1A and 1B, and FIG. 3 is an exploded perspective view of a main portion of the lens barrier device 1. FIG. 4 is an exploded perspective view, as seen from the optical axis forward end side, of a part of the components illustrated in FIG. 3. FIGS. 5A and 5B are perspective views of barrier blades, with a barrier base 40 illustrated in FIGS. 3 and 4 being omitted.

As illustrated in FIGS. 1A and 1B through FIGS. 5A and 5B, the lens barrier device 1 has two outer barrier blades 20a and 20b, two inner barrier blades 30a and 30b, a barrier base 40, a drive cam ring (drive member) 50, a barrier unit base 60, and a motor 70. The two outer barrier blades 20a and 20b and the two inner barrier blades 30a and 30b are on the optical axis forward end side with respect to a photographing lens, and rotate so as to allow opening and closing.

The two outer barrier blades 20a and 20b, and the two inner barrier blades 30a and 30b function respectively as a first barrier blade and a second barrier blade. The external cover 10 has an opening 11.

Blade shafts 41a and 41b are formed on the external cover 10 side of the barrier base 40 (the left-hand side in FIGS. 2 and 3, and the right-hand side in FIG. 4). The blade shafts 41a and 41b are provided on a line orthogonal to the lens optical axis direction in point symmetry with the optical axis at the center.

The outer barrier blades 20a and 20b respectively have shaft holes 21a and 21b, regulating pins 22a and 22b, and elongated holes 23a and 23b. The inner barrier blades 30a and 30b respectively have shaft holes 31a and 31b, spring engagement portions 32a and 32b, and cutout portions 33a and 33b.

The outer barrier blades 20a and 20b, which are of the same configuration, shield the outer peripheral portions of the lens optical axis, that is, the outer peripheral portions of the opening 11 of the external cover 10 and of the opening 42 of the barrier base 40.

The inner barrier blades 30a and 30b, which are of the same configuration, shield the portions in the vicinity of the lens optical axis, that is, the central portions of the opening 11 of the external cover 10 and of the opening 42 of the barrier base 40.

By the four barrier blades 20a, 20b, 30a, and 30b, it is possible to shield all the opening regions of the opening 11 of the external cover 10 and of the opening 42 of the barrier base 40.

The inner barrier blade 30a is swingably pivoted by the blade shaft 41a of the barrier base 40 through the shaft hole 31a. The outer barrier blade 20a is swingably pivoted through fit-engagement of the shaft hole 21a with a fit-engagement shaft 36a concentrically provided on the outer peripheral side of the shaft hole 31a of the inner barrier blade 30a.

As a result, both the inner barrier blade 30a and the outer barrier blade 20a are pivoted so as to be rotatable around the blade shaft 41a of the barrier base 40. Similarly, the outer barrier blade 20b and the inner barrier blade 30b are pivoted so as to be rotatable around the blade shaft 41b.

[Unit Structure of the Lens Barrier Device]

In the following, the unit structure of the lens barrier device of the present exemplary embodiment will be described in detail.

Figure 6:
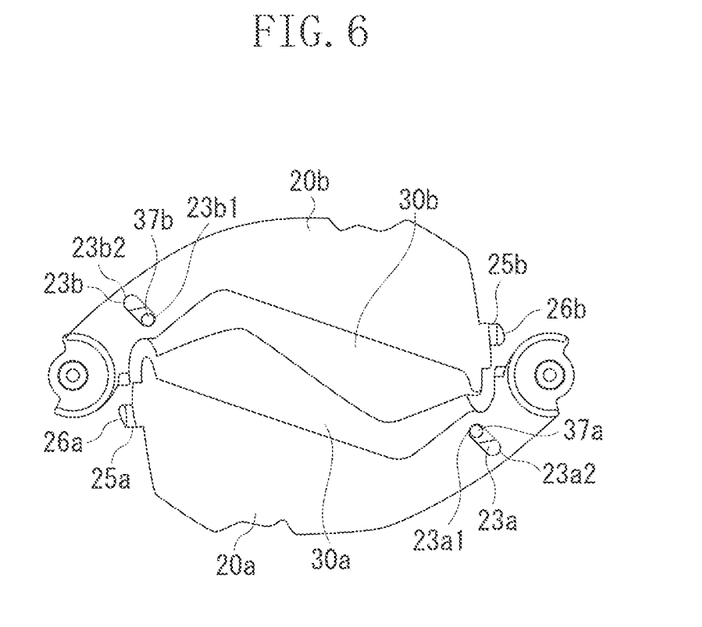
FIG. 6 is a first diagram illustrating a structure of the barrier blades.
Figure 7:
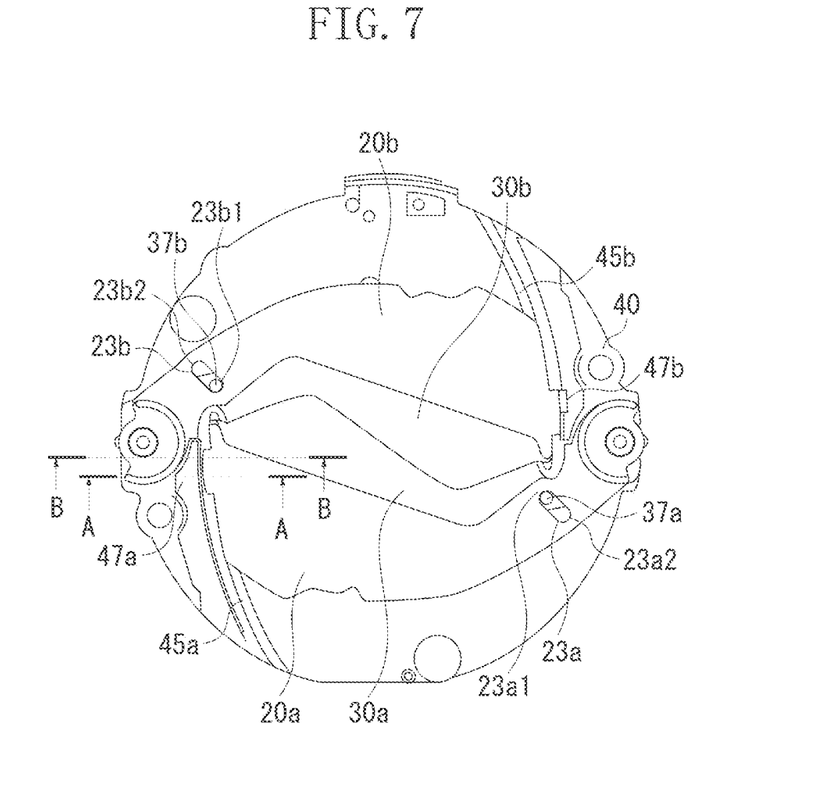
FIG. 7 is a second diagram illustrating a structure of the barrier blades.

FIGS. 6 and 7 are diagrams illustrating the four barrier blades as seen from the external cover 10 side, for illustrating the barrier blade interlock opening/closing principle described below. FIG. 6 solely includes the inner barrier blades 30a and 30b, and the outer barrier blades 20a and 20b. FIG. 7 is a diagram including the barrier base 40 in addition to what is illustrated in FIG. 6.

Figure 8:
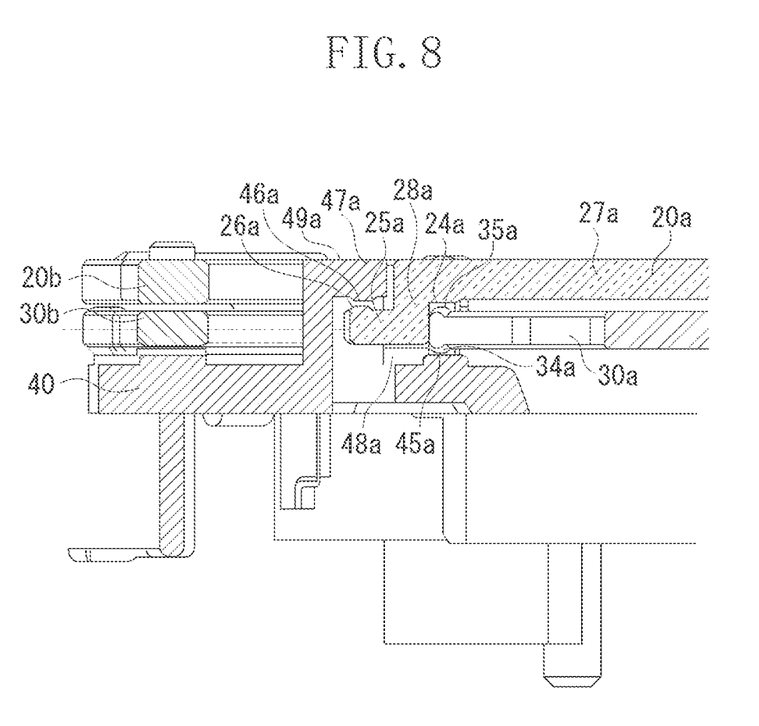
FIG. 8 is a first explanatory sectional view of the barrier blades.
Figure 9:
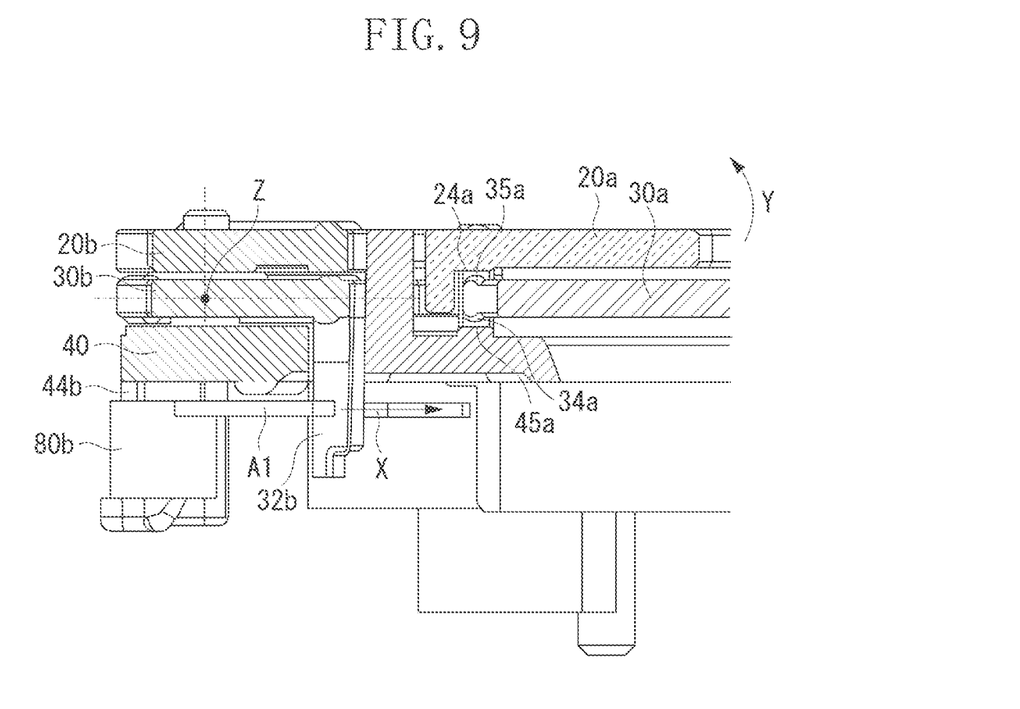
FIG. 9 is a second explanatory sectional view of the barrier blades.

FIG. 8 is a sectional view taken along the line A-A of FIG. 7. FIG. 9 is a sectional view taken along the line B-B of FIG. 7 for illustrating the influence of urging due to torsion springs 80a and 80b described below. For the sake of description, the schematic configuration of the torsion springs 80a and 80b are also additionally illustrated therein. To simplify the description, of the barrier blade structure, which has of a symmetrical configuration, FIGS. 8 and 9 only illustrate one side thereof.

In FIG. 8, a second guide portion 34a is a guide portion in which, in the outer peripheral portion of the inner barrier blade 30a, the rotation of the inner barrier blade 30 is guided by a first guide portion 45a of the barrier base 40. A third guide portion 35a is a guide portion in which, in the outer peripheral portion of the inner barrier blade, the rotation of the inner barrier blade 30 is guided by a fourth guide portion 24a of the outer barrier blade 20a. In the present exemplary embodiment, the second guide portion 34a and the third guide portion 35a are provided at positions opposed to each other.

As illustrated in FIGS. 4 and 8, assuming that the portion shielding the opening 11 in the closed state is a shielding portion 27a, the outer barrier blade 20a has an outer peripheral protrusion 25a on the outer peripheral side of the shielding portion 27a. The outer peripheral protrusion 25a is arranged at a position where it overlaps the inner barrier blade 30a in the optical axis direction, which, in this case, is substantially the same position, so as to protrude in the outer peripheral extending direction of the inner barrier blade 30a.

A connecting portion 28a connects the outer peripheral protrusion 25a and the shielding portion 27a, whose positions in the optical axis direction are different from each other, and is arranged on the outer peripheral side of the shielding portion 27a. A second regulating portion 26a is provided at the optical axis forward end side of the outer peripheral protrusion 25a. In the present exemplary embodiment, the second regulating portion 26a is substantially of the same height as the third guide portion 35a of the inner barrier blade 30a in the optical axis direction.

On the other hand, the barrier base 40 is provided with a protrusion 47a on the outer peripheral side of the first guide portion 45a. The protrusion 47a protrudes from the barrier base member 40 so as to be positioned on the optical axis forward end side with respect to the barrier base 40, which is on the optical axis rear end side of the inner barrier blade 30a.

As described above, the protrusion 47a protrudes to the optical axis forward end side from the barrier base portion 40 to extend over the inner peripheral side end surface, with the result that an inner peripheral side space 48a is formed. The outer peripheral protrusion 25a of the outer barrier blade 20a is inserted into the inner peripheral side space 48a to enter this space.

Further, a first regulating portion 46a is formed at the position of the protrusion 47a opposed to the second regulating portion 26a of the outer barrier blade 20a. The regulating portion 46a is arranged on the outer peripheral side with respect to the guide portion 45a in a plane perpendicular to the optical axis of the photographing lens.

The regulating portion 46a is arranged substantially at the same position in the optical axis direction as the surface on the optical axis forward end side of the inner barrier blade 30a. Thus, the outer barrier blade 20a and the inner barrier blade 30a are held between the guide portion 45a guiding the rotation of the inner barrier blade 30a and the first regulating portion 46a.

While FIGS. 8 and 9 illustrate one side of a symmetrical structure, the other side thereof is of the same configuration as described above.

[Assembling Method of the Barrier Apparatus]

An assembling method of the present configuration will be described below. First, the blade shaft 41a of the barrier base 40 is inserted into the shaft hole 31a of the inner barrier blade 30a. Next, the outer peripheral protrusion 25a of the outer barrier blade 20a is inserted into the inner peripheral side space 48a of the barrier base 40. After this, the fit-engagement shaft 36a of the inner barrier blade 30a is inserted into the shaft hole 21a of the outer barrier blade 20a, whereby the present barrier apparatus can be suitably assembled. While only one side of a symmetrical configuration has been described, the other side thereof is of the same configuration as described above.

[Effect Due to the Above Construction]

Due to this configuration, the displacement of the outer barrier blades 20a and 20b toward the optical axis forward end side is regulated by the regulating portion 46a of the barrier base 40. The outer barrier blade 20a and the inner barrier blade 30a are held between the guide portion 45a, which guides the rotation of the inner barrier blade 30a, and the regulating portion 46a.

Thus, the above structure can be formed as a unit, so that the outer barrier blades 20a and 20b are not easily detached from the barrier base 40. Thus, a lens barrier device can be formed in a unit without using the external cover 10 and additional components. As a result, it is possible to provide a lens barrier device that can reduce the influence of the deformation due to the mounting of the external cover 10.

In the present exemplary embodiment, the first regulating portion 46a and the second regulating portion 26a also serve to guide the rotation of the barrier base 40 and the outer barrier blade 20a. This also applies to the outer barrier blade 20b.

Due to the structure in which the outer peripheral protrusion 25a of the outer barrier blade 20a is connected by the above-mentioned connecting portion 28a, the optical axis forward end side end surface 49a of the protrusion 47a of the barrier base 40 can be formed at a position where it overlaps the outer barrier blade 20a in the optical axis direction.

Thus, as compared with the case in which the first regulating portion of the barrier base 40 is simply arranged on the upper surface of the outer barrier blade 20a, it is possible to achieve a reduction in height in the optical axis direction. This also applies to the outer barrier blade 20b.

[Other Constructions]

For example, in the present exemplary embodiment, the shielding portion 27a, the connecting portion 28a, and the outer peripheral protrusion 25a are formed integrally. In this regard, it is also possible to form all or a part of them as separate components, connecting them by a method such as screws or welding. In this case, although the number of components increases, it is possible to achieve a reduction in height in the optical axis direction as mentioned above.

Further, it is also possible to arrange the second regulating portion 26a farther on the rear side (imaging surface side) in the optical axis direction with respect to the third guide portion 35a of the inner barrier blade 30a (which also applies to the inner barrier blade 30b). As a result, it is possible to arrange the end surface 49a of the barrier base 40 farther on the rear side in the optical axis direction. Thus, the size of the lens barrier device 1 can be further reduced.

Further, it is also possible to arrange the second regulating portion 26a between the third guide portion 35a of the inner barrier blade 30a and the optical-axis-direction forward end side surface of the shielding portion 27a of the outer barrier blade 20a. As a result, the end surface 49a of the barrier base 40 is positioned on the optical-axis-direction forward end side, so that the height in the optical axis direction of the lens barrier device 1 is larger than in the above-described construction.

However, as compared with the case in which the end surface 49a of the barrier base 40 is simply arranged on the optical axis forward end side of the shielding portion 27a, it is possible to achieve the effect of reducing the height in the optical axis direction of the lens barrier device 1.

While, in the present exemplary embodiment, four barrier blades are used, it is also possible, for example, in the construction illustrated in FIG. 3, to cover the entire opening 11 solely by the two barrier blades of the inner barrier blade 30a on the lower side in FIG. 3 and the outer barrier blade 20a.

Further, it is also possible to use one barrier blade increased in size on the upper side in the FIG. 3 in addition to the inner barrier blade 30a on the lower side in FIG. 3 and the outer barrier blade 20a, thus using three barrier blades in total.

[Barrier Blade Drive Structure]

Next, the barrier blade drive structure will be described in detail. As illustrated in FIG. 3, in addition to the opening 42, the barrier base 40 has relatively large rotation holes 43a and 43b allowing spring engagement portions 32a and 32b of the inner barrier blades 30a and 30b to protrude and rotate. The rotation holes 43a and 43b are of a (substantially) rectangular configuration, with the long sides thereof extending in the peripheral direction of the barrier base 40.

Further, the barrier base 40 has spring shafts 44a and 44b allowing attachment and pivoting of the coil portions of torsion springs (torsion coil springs) 80a and 80b. In FIG. 2 through FIGS. 5A and 5B, the torsion springs 80a and 80b are illustrated schematically, and its configuration is illustrated in detail in FIG. 10.

A drive cam ring 50 has a flat tooth 51 and spring engagement portions 52a and 52b. The flat tooth 51 is engaged with a gear train (not illustrated), and, due to the flat tooth 51 and the gear train, the drive force of the motor 70 is transmitted to the drive cam ring 50, rotating the drive cam ring 50. The spring engagement portions 52a and 52b of the drive cam ring 50 rotate within the rotation holes 43a and 43b of the barrier base 40.

The winding angle of the torsion springs 80a and 80b is approximately 300 degrees, and the arm portions extending from both sides of the coil portions cross as seen from the direction in which the coil portions extend, that is, the lens optical axis direction. And, in the assembled state, the spring engagement portion 32a of the inner barrier blade 30a and the spring engagement portion 52a of the drive cam ring 50 are positioned in the region between the two arm portions of the torsion spring 80a (the region on the front side of the crossing position).

Similarly, the spring engagement portion 32b of the inner barrier blade 30b and the spring engagement portion 52b of the drive cam ring 50 are positioned in the region between the two arm portions of the torsion spring 80b (region on the front side of the crossing position). The torsion springs 80a and 80b urge the inner barrier blades 30a and 30b in both the opening and closing directions.

Next, the opening/closing drive of the four barrier blades will be described with reference to FIGS. 5A, 5B, and 6. FIG. 5A illustrates the four barrier blades in the closed state, and FIG. 5B illustrates the four barrier blades in the open state.

As illustrated in FIG. 5A, in the state in which the four barrier blades are closed, arm portions A1 of the torsion springs 80a and 80b are engaged with the spring engagement portions 52a and 52b of the drive cam ring 50 while imparting an urging force thereto. Further, arm portions A2 of the torsion springs 80a and 80b are engaged with the spring engagement portions 32a and 32b of the inner barrier blades 30a and 30b while imparting an urging force thereto.

In this state, when the drive cam ring 50 gradually rotates in the direction of the arrow illustrated in FIG. 5A (counterclockwise), the spring engagement portions 52a and 52b of the drive cam spring 50 are moving away from the arm portions A1 of the torsion springs 80a and 80b. Thus, the torsion springs 80a and 80b gradually rotate clockwise (downwardly as seen in FIG. 5A) around the spring shafts 44a and 44b.

The torsion springs 80a and 80b rotate clockwise around the spring shafts 44a and 44b, whereby the arm portions A1 are engaged with the spring engagement portions 32a and 32b of the inner barrier blades 30a and 30b, acting so as to gradually open the inner barrier blades 30a and 30b.

In this case, after the inner barrier blades 30a and 30b have been opened to some degree, the outer barrier blades 20a and 20b are opened as the inner barrier blades 30a and 30b are opened. The principle of this operation will be described below with reference to FIG. 6.

And, as illustrated in FIG. 5B, in the state in which the four barrier blades have been completely opened, the arm portions A1 of the torsion springs 80a and 80b are engaged with the spring engagement portions 32a and 32b of the inner barrier blades 30a and 30b while imparting an urging force thereto.

Further, in the state in which the four barrier blades have been completely opened, the arm portions A2 of the torsion springs 80a and 80b are engaged with the spring engagement portions 52a and 52b of the drive cam ring 50 while imparting an urging force thereto. Further, in the state in which the four barrier blades have been completely opened, the cutout portions 33a and 33b of the inner barrier blades 30a and 30b are engaged with the regulating pins 22a and 22b of the outer barrier blades 20a and 20b.

In the state of FIG. 5B, when the drive cam ring 50 rotates in the direction of the arrow illustrated in FIG. 5B (clockwise), the four barrier blades are placed in the closed state illustrated in FIG. 5A on the same principle as in the case of opening. In this case also, after the inner barrier blades 30a and 30b have been closed to some degree, the outer barrier blades 20a and 20b are gradually closed as the inner barrier blades 30a and 30b are closed.

[Interlock Opening/Closing Principle of the Outer Barrier Blades 20a and 20b]

Next, the interlock opening/closing principle of the outer barrier blades 20a and 20b will be described with reference to FIG. 6. As described above, the outer barrier blades 20a and 20b have the elongated holes 23a and 23b.

On the other hand, the inner barrier blades 30a and 30b have drive pins 37a and 37b on the surfaces thereof opposed to the outer barrier blades 20a and 20b. At the time of assembly, the drive pins 37a and 37b are inserted into the elongated holes 23a and 23b, and can move within the range of the elongated holes 23a and 23b.

As illustrated in FIG. 6, in the state in which the four barrier blades are closed, the drive pins 37a and 37b are positioned at closing-side end portions 23a1 and 23b1 of the elongated holes 23a and 23b. When, with the four barrier blades closed, the inner barrier blades 30a and 30b are gradually opened, the drive pins 37a and 37b gradually move toward opening-side end portions 23a2 and 23b2 of the elongated holes 23a and 23b. Then, they abut the opening-side end portions 23a2 and 23b2.

In this case, until the drive pins 37a and 37b abut the opening-side end portions 23a2 and 23b2 of the elongated holes 23a and 23b, only the inner barrier blades 30a and 30b are opened, and the outer barrier blades 20a and 20b remain at rest.

And, when, with the drive pins 37a and 37b being in contact with the opening-side end portions 23a2 and 23b2 of the elongated holes 23a and 23b, the inner barrier blades 30a and 30b are further opened, the opening force is transmitted to the outer barrier blades 20a and 20b via the drive pins 37a and 37b. As a result, the outer barrier blades 20a and 20b are opened in synchronization with the opening of the inner barrier blades 30a and 30b.

In the case in which the four barrier blades are closed from the open state, the drive pins 37a and 37b abut the closing-side end portions 23a1 and 23b1 of the elongated holes 23a and 23b in the course of closing. Thus, also in the case of closing, the outer barrier blades 20a and 20b are closed during and in synchronization with the closing movement of the inner barrier blades 30a and 30b.

[Structure of the Torsion Springs 80a and 80b]

Figure 10A:
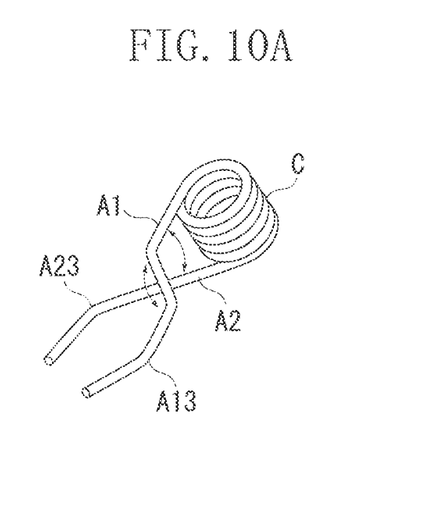
FIGS. 10A through 10C are diagrams illustrating a configuration of a torsion spring.
Figure 10B:
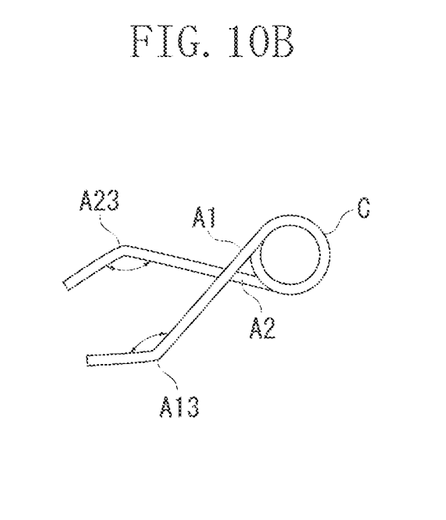
Figure 10C:
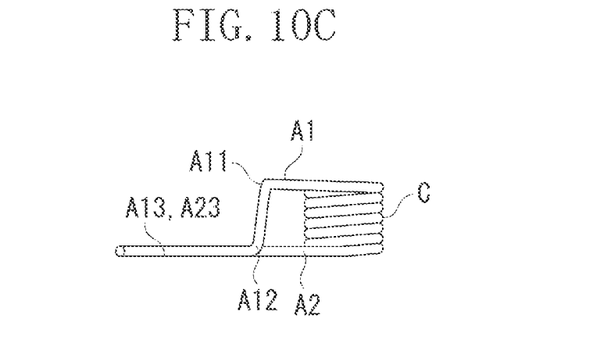

Next, the structure of the torsion springs 80a and 80b will be described with reference to FIGS. 10A, 10B, and 10C. Each of the torsion springs 80a and 80b has a coil portion C and two arm portions A1 and A2 extending from both sides of the coil portion C. The two arm portions A1 and A2 are at an angle of approximately 300 degrees, and cross as seen from the direction in which the coil portion C extends (the lens optical axis direction).

One arm portion A1 has bent portions A11 and A12 that are greatly bent, and a bent portion A13 that is slightly bent. The other arm portion A2 has a bent portion A23 slightly bent.

Due to the bent portions A11 and A12 that are greatly bent, the two arm portions A1 and A2 are at the same position in the lens optical axis direction. Due to the formation of the two arm portions A1 and A2, the positions at which the arm portion A1 and the spring engagement portions 32a and 32b of the inner barrier blades 30a and 30b are engaged with each other are close to the inner barrier blades 30a and 30b. As a result, it is possible to drive the inner barrier blades 30a and 30b with a force as small as possible.

The bent portions A13 and A23 that are slightly bent are formed at positions near the distal ends of the arm portions A1 and A2, that is, at positions nearer to the distal ends than the above-mentioned crossing position. Each of them is bent so as to approach the other arm portion A2, A1 (i.e., so as to approach each other).

As illustrated in FIGS. 5A and 5B, the spring engagement portions 32a and 32b of the inner barrier blades 30a and 30b are positioned nearer to the coil portions C of the torsion springs 80a and 80b than the spring engagement portions 52a and 52b of the drive cam ring 50.

Thus, in the portions nearer to the coil portions C than the bent portions A13 and A23, the spring engagement portions 32a and 32b of the inner barrier blades 30a and 30b are engaged, and, on the distal end side of the bent portions A13 and A23, the spring engagement portions 52a and 52b of the drive cam ring 50 are engaged.

In the drive structure using the above-described torsion springs 80a and 80b, the structure of the first regulating portions 46a and 46b of the barrier base 40 and of the outer barrier blades 20a and 20b of the present invention proves even more effective.

Figure 11:
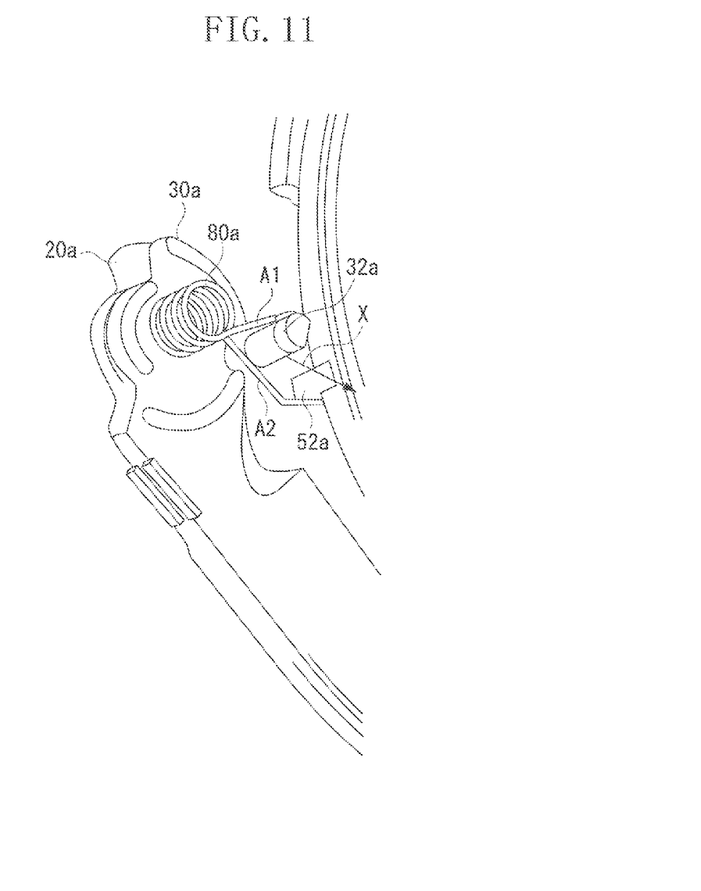
FIG. 11 is a diagram illustrating the operation of the torsion spring.

FIG. 11 is an enlarged view of the portion where the torsion springs 80a and 80b and the inner barrier blades 30a and 30b are in contact with each other. As is apparent from FIGS. 10A, 10B, 10C, and 11, the arm portions A1 and A2 of the torsion springs 80a and 80b of the present exemplary embodiment are arranged so as to cross the spring engagement portion 32a, 32b of the inner barrier blades 30a and 30b.

Thus, due to the restoring force of the coil spring, the arm portions A1 and A2 are urged in the closing direction, and the spring engagement portion 32a, 32b of the inner barrier blades 30a and 30b is constantly urged in the direction of the arrow X of FIG. 11 (which is also illustrated in FIG. 9). As a result, as illustrated in FIG. 9, there is generated in the inner barrier blades 30a and 30b a rotational moment in the direction of the arrow Y around the point Z, which corresponds to the fit-engagement portion between the shaft hole 31a, 31b and the blade shaft 41a, 41b of the barrier base 40.

As a result of the generation of this rotational moment, the inner barrier blades 30a and 30b rotate due to the fit-engagement play of the fit-engagement portion, and the third guide portion 35a, 35b, which is the outer peripheral end, rises on the optical axis forward end side. Further, due to the rising of the inner barrier blades 30a and 30b, the second regulating portions 26a and 26b, which is the outer peripheral end of the outer barrier blade 20a, 20b, rises to the greatest degree.

Accordingly, the second regulating portions 26a and 26b, which rise to the greatest degree and which are the outer peripheral end of the outer barrier blades 20a and 20b, are regulated by the first regulating portions 46a and 46b of the barrier base 40, whereby it is possible to suitably suppress the rising due to the urging by the torsion springs 80a and 80b.

In particular, since the regulating portion also has a guide function, a suitable opening/closing movement is realized. If the portion, where the rising generated by the urging of the torsion springs 80a and 80b is maximum, is not regulated, an unintended portion might be brought into contact, so that there would be a possibility of the suitable opening/closing movement being hindered.

The present invention is not limited to the above-described exemplary embodiment. For example, instead of a lens barrier device having four barrier blades, the present invention is also applicable to solely one side of a lens barrier device having one blade on one side and two blades on the opposite side.

Further, the drive structure may be of some other structure than the above-described one. For example, instead of the torsion springs 80a and 80b, it is also possible to use ordinary coil springs utilizing tensile compression, or to alter the structure of the drive cam ring 50.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-295439 filed Dec. 25, 2009, which is hereby incorporated by reference herein in its entirety.

What is claimed is:

1. A lens barrier device comprising:
first and second barrier blades positioned on an object side with respect to an imaging lens, each of the first and second barrier blades configured to rotate so as to allow opening and closing;
a barrier base retaining the first and second barrier blades; and
a drive unit configured to open and close the first and second barrier blades,
wherein the first barrier blade is on the object side with respect to the second barrier blade, and
wherein the first and second barrier blades are arranged between a guide portion provided on the barrier base and a regulating portion provided on the barrier base, the guide portion receiving an opposite side against the object side of the second barrier blade and guiding the second barrier blade in rotation of the second barrier blade, the regulating portion positioned on the object side of the first barrier blade and configured to regulate the position in the optical axis direction of the first barrier blade in rotation of the first barrier blade.

2. The lens barrier device according to claim 1, wherein the regulating portion is arranged on an outer peripheral side with respect to the guide portion in a plane perpendicular to the optical axis.

3. The lens barrier device according to claim 1, wherein the regulating portion is arranged at a position different from the position of an object side surface of the first barrier blade in the optical axis direction.

4. The lens barrier device according to claim 3, wherein the regulating portion is arranged at the same position as an object side surface of the second barrier blade in the optical axis direction.

5. A lens barrier device comprising:
first and second barrier blades positioned on an object side with respect to an imaging lens, each of the first and second barrier blades configured to rotate so as to allow opening and closing;
a barrier base retaining the first and second barrier blades; and
a drive unit configured to open and close the first and second barrier blades,
wherein the first barrier blade is on the object side with respect to the second barrier blade, and
wherein, in the case of the first and second barrier blades positioned in a predetermined position, a guide portion provided on the barrier base contacts a side of the second barrier blade opposite the object side of the second barrier blade, and a regulating portion provided on the barrier base is positioned on the object side of the first barrier blade and is configured to regulate the position in the optical axis direction of the first barrier blade.

6. The lens barrier device according to claim 5, wherein the regulating portion is arranged on an outer peripheral side with respect to the guide portion in a plane perpendicular to the optical axis.

7. The lens barrier device according to claim 5, wherein the regulating portion is arranged at a position different from the position of an object side surface of the first barrier blade in the optical axis direction.

8. The lens barrier device according to claim 7, wherein the regulating portion is arranged at the same position as an object side surface of the second barrier blade in the optical axis direction.

9. The lens barrier device according to claim 5, wherein the predetermined position is an open position of the first and second blades.

* * * * *